United States Patent
Shibata et al.

(10) Patent No.: US 7,513,482 B2
(45) Date of Patent: Apr. 7, 2009

(54) ACTUATOR FOR CONTROLLING BRAKE HYDRAULIC PRESSURE AND SOLENOID VALVE THEREOF

(75) Inventors: Takayuki Shibata, Nagoya (JP); Koji Yanai, Kariya (JP); Toru Fujita, Obu (JP); Tomoaki Kawabata, Takahama (JP)

(73) Assignee: Advics Co., Ltd., Kariya, Aichi (JP)

( * ) Notice: Subject to any disclaimer, the term of this patent is extended or adjusted under 35 U.S.C. 154(b) by 220 days.

(21) Appl. No.: 11/589,896

(22) Filed: Oct. 31, 2006

(65) Prior Publication Data
US 2007/0108401 A1 May 17, 2007

(30) Foreign Application Priority Data
Nov. 11, 2005 (JP) ............................. 2005-327724
Nov. 11, 2005 (JP) ............................. 2005-327740
Aug. 10, 2006 (JP) ............................. 2006-218778

(51) Int. Cl.
*F16K 31/02* (2006.01)

(52) U.S. Cl. ............... 251/129.15; 251/903; 303/119.2; 303/119.3

(58) Field of Classification Search ............. 251/129.15, 251/903; 303/119.2, 119.3
See application file for complete search history.

(56) References Cited

U.S. PATENT DOCUMENTS

| | | | | |
|---|---|---|---|---|
| 4,446,889 A | * | 5/1984 | Sakakibara et al. | 335/274 |
| 4,523,739 A | * | 6/1985 | Johansen et al. | 251/129.21 |
| 5,462,344 A | * | 10/1995 | Jakob et al. | 303/119.3 |
| 5,513,905 A | * | 5/1996 | Zeides et al. | 303/119.3 |
| 6,145,543 A | * | 11/2000 | Ohishi et al. | 303/119.3 |
| 6,453,936 B1 | * | 9/2002 | Frank et al. | 251/129.15 |
| 2004/0232763 A1 | * | 11/2004 | Otsuka et al. | 303/119.2 |
| 2004/0239178 A1 | * | 12/2004 | Otsuka | 303/119.3 |
| 2005/0023893 A1 | * | 2/2005 | Sanada | 303/119.3 |
| 2005/0073194 A1 | * | 4/2005 | Katayama | 303/119.2 |

FOREIGN PATENT DOCUMENTS

| JP | 9-118215 A | 5/1997 |
|---|---|---|
| JP | 2005-007955 A | 1/2005 |
| WO | WO 2005009815 A2 * | 2/2005 |

* cited by examiner

*Primary Examiner*—John Bastianelli
(74) *Attorney, Agent, or Firm*—Buchanan Ingersoll & Rooney PC (57) ABSTRACT

A solenoid valve for use in an actuator for controlling brake hydraulic pressure includes a valve housing, a movable core having an integral valve rod and axially slidably received in the valve housing, and a valve body configured to be moved into and out of contact with a valve seat when the valve body moves. The solenoid valve further includes a yoke having a U-shaped section. The flanges of the yoke have first ends that extend substantially along the outer peripheral edges of the coil winding to minimize the length of the flanges and thus the length of the solenoid valve.

5 Claims, 12 Drawing Sheets

ACTUATOR FOR CONTROLLING BRAKE HYDRAULIC PRESSURE AND SOLENOID VALVE THEREOF

CROSS REFERENCE TO RELATED APPLICATIONS

This application is based on and claims priority under 35 U.S.C. sctn. 119 with respect to Japanese Patent Application No. 2005-327724 filed on Nov. 11, 2005, No. 2005-327740 filed on Nov. 11, 2005, and No. 2006-218778 filed on Aug. 10, 2006, the entire contents of which are incorporated herein by reference.

BACKGROUND OF THE INVENTION

This invention relates to an actuator for controlling brake hydraulic pressure in a vehicle brake system, and solenoid valves used therein.

Figure 6:
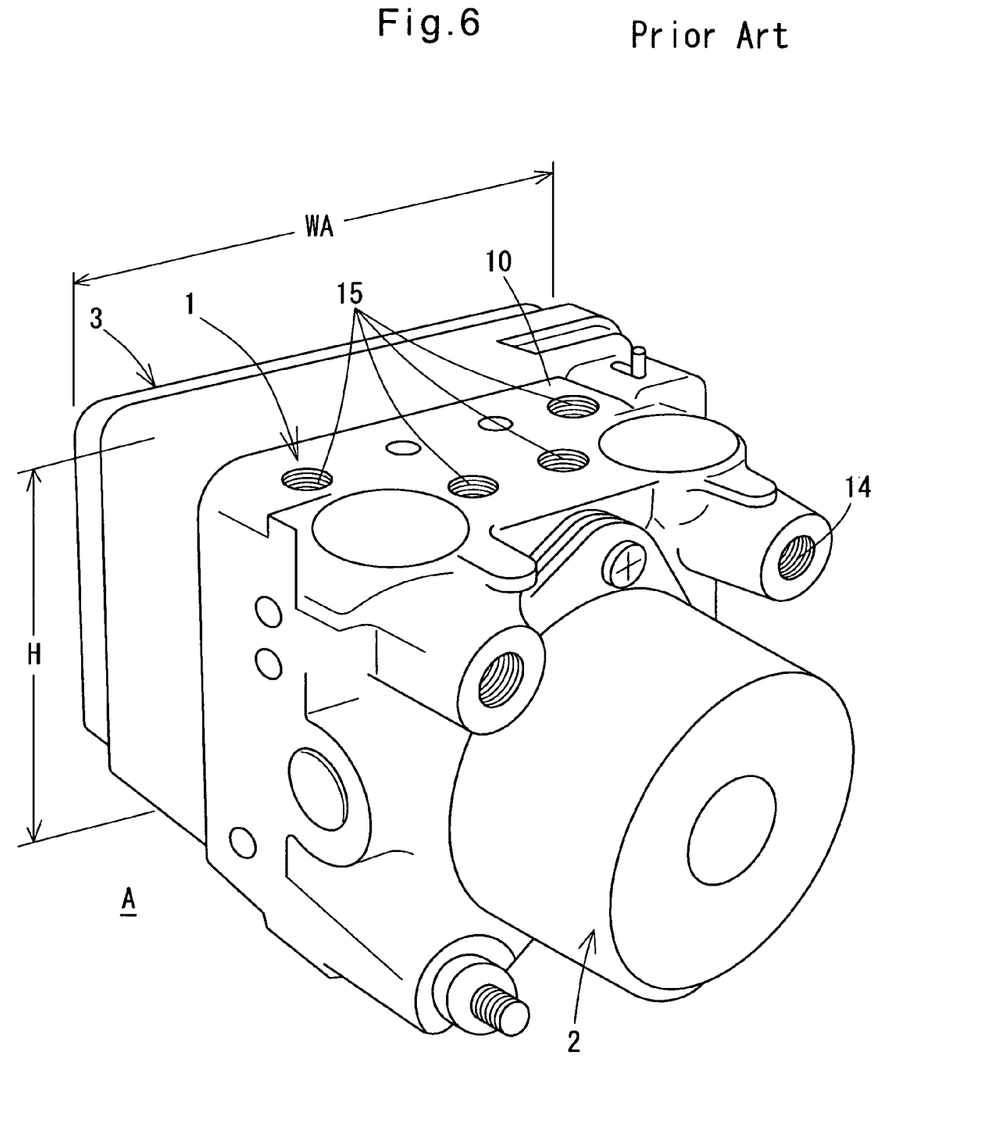
FIG. 6 is a schematic perspective view of an actuator for controlling brake hydraulic pressure.
Figure 7:
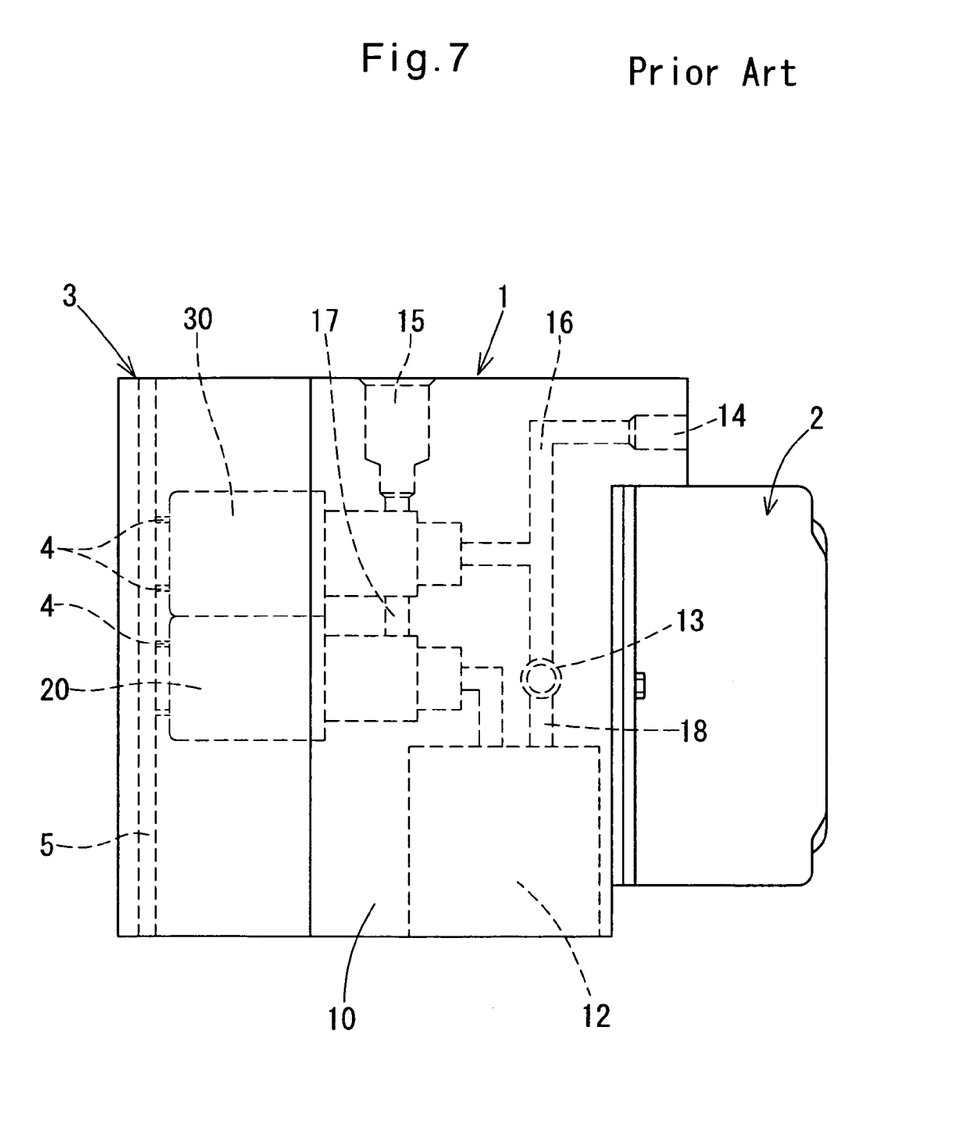
FIG. 7 is a front view of the actuator of FIG. 6.

As shown in FIGS. 6 and 7, a typical actuator A for controlling brake hydraulic pressure in a vehicle brake system A comprises a hydraulic unit 1, a motor unit 2 mounted to one end of the hydraulic unit 1, and an electronic control unit (ECU) 3 mounted to the other end of the hydraulic unit 1.

Typically, the hydraulic unit 1 includes a reservoir 12, a pump 13, pressure increasing control valves 20 and pressure reducing control valves 30, which are all mounted in a housing 10 made of aluminum. The housing 10 is formed with a master cylinder port 14 and wheel cylinder ports 15 which communicate with the master cylinder port 14 through passages 16 in which the pressure increasing valves 30 are disposed. The wheel cylinder ports 15 also communicate with the reservoir 12 through passages 17 in which the pressure reducing valves 20 are disposed and through passages 18 in which the pump 13 and the pressure increasing valves 30 are disposed. This arrangement is shown in JP patent publication 2005-7955A.

Figure 8:
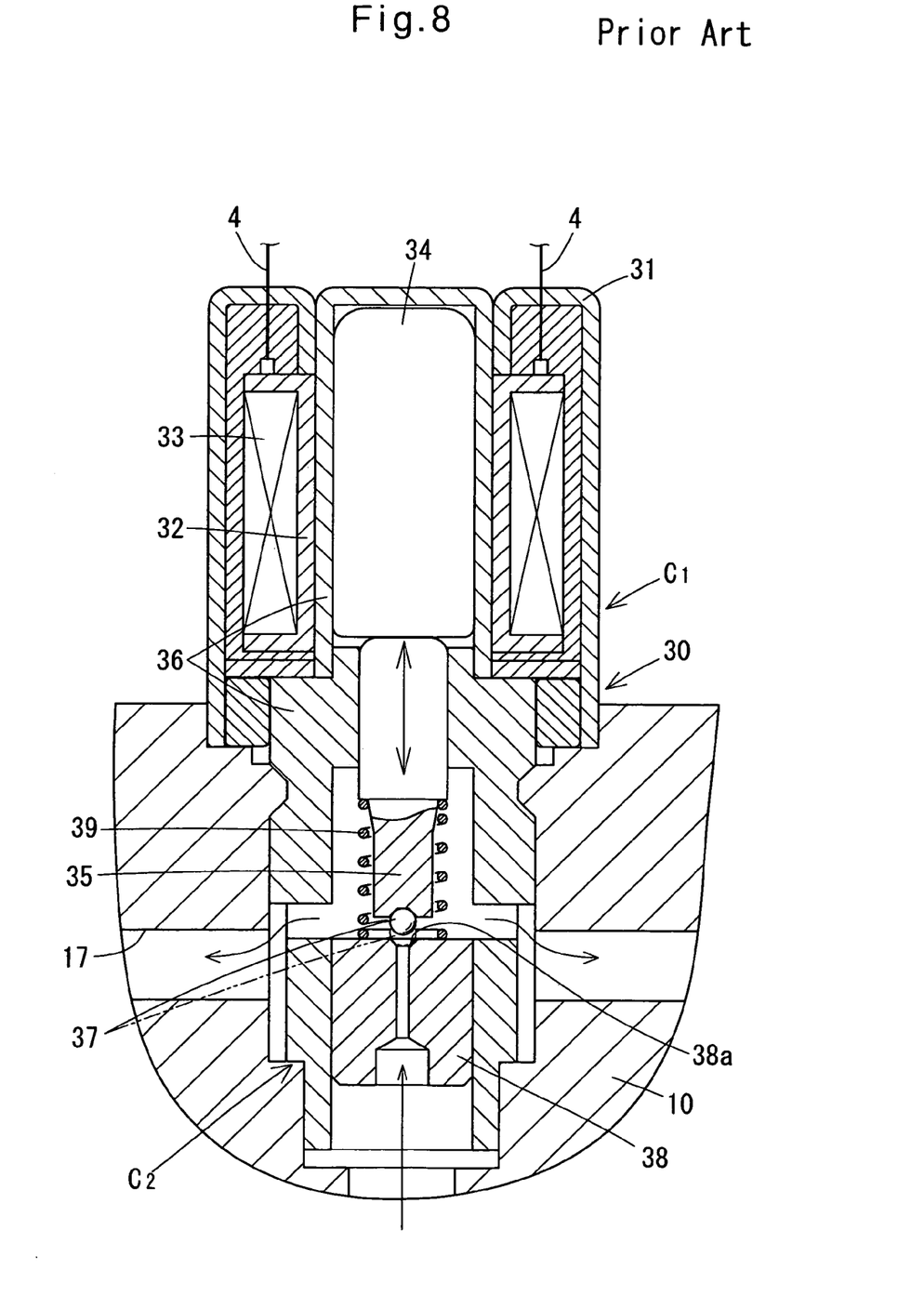
FIG. 8 is a partially cutaway front view of a pressure increasing valve for an actuator for controlling brake hydraulic pressure.

The control valves 20 and 30 of the hydraulic unit 1 are solenoid valves. Typically, as shown in FIG. 8 and also in FIG. 2 of JP patent publication 2005-7955A, the pressure increasing control valves 30 each include a tubular yoke 31, a tubular bobbin 32 received in the tubular yoke 31, a current-excited coil 33 wound around the bobbin 32, and a movable core (plunger) 34 having a valve rod 35 and axially movably received in the bobbin 32 through a guide (valve housing) 36. A valve body 37 is disposed at the free end of the valve rod 35 and is moved into and out of contact with a seating surface 38a of a valve seat 38 by the core 34. In FIG. 8, numeral 4 indicates a terminal through which electricity is supplied to the coil 33, and 39 indicates a return spring for the valve rod 35.

Figure 9:
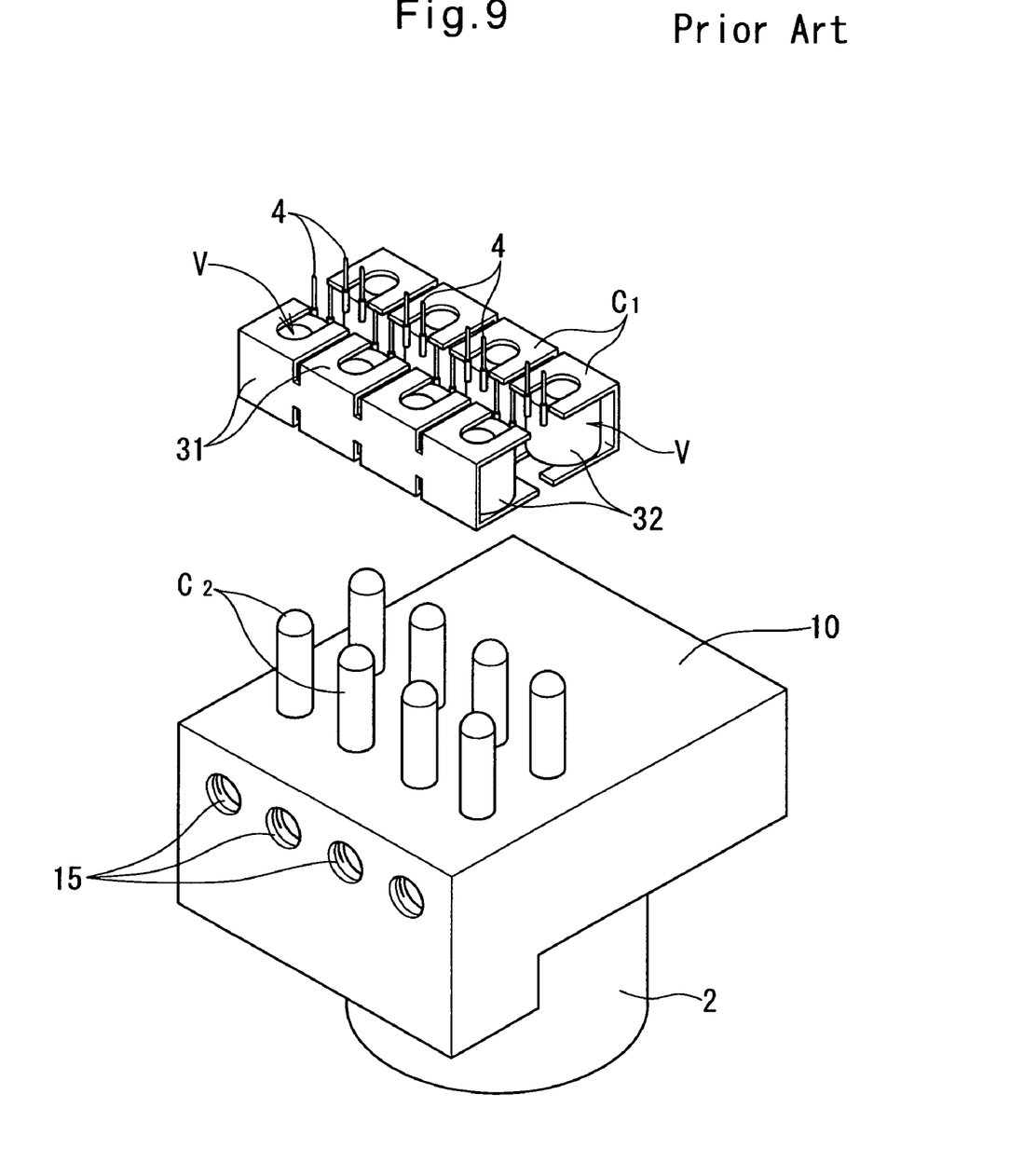
FIG. 9 is a partial exploded perspective view of a conventional actuator for controlling brake hydraulic pressure.

Ordinarily, this type of actuator A includes eight or more hydraulic pressure control valves V (solenoid valves 20 and 30) that are arranged in a plurality of rows and a plurality of columns. In order to facilitate mounting of such control solenoid valves 20 and 30 (which are sometimes referred to as "control solenoid valves V" or "solenoid valves V"), as shown in FIG. 9, JP patent publication 09-118215A discloses an arrangement in which the yokes 31 of the respective eight solenoid valves V are integrally formed (see FIG. 3 of this publication). The yokes 31 have a substantially U-shaped cross-section and are arranged in two rows such that the yokes in each row are mirror images of the yokes in the other row with their openings facing the openings of the yokes in the other row. In each of the (eight) yokes 31, a coil 33 is mounted.

The conventional solenoid valve V shown in FIG. 8 has the tubular yoke 31 (circular in section). A plurality of such solenoid valves V are mounted in the housing 10 at predetermined intervals as shown in FIG. 10.

With an increase in the number of electronic devices used in today's vehicles, it is increasingly required to reduce the size and cost of individual parts thereof, including an actuator A mounted in the engine compartment for controlling brake hydraulic pressure. It is especially required to reduce the height H (see FIG. 6) of the actuator A.

Figure 10:
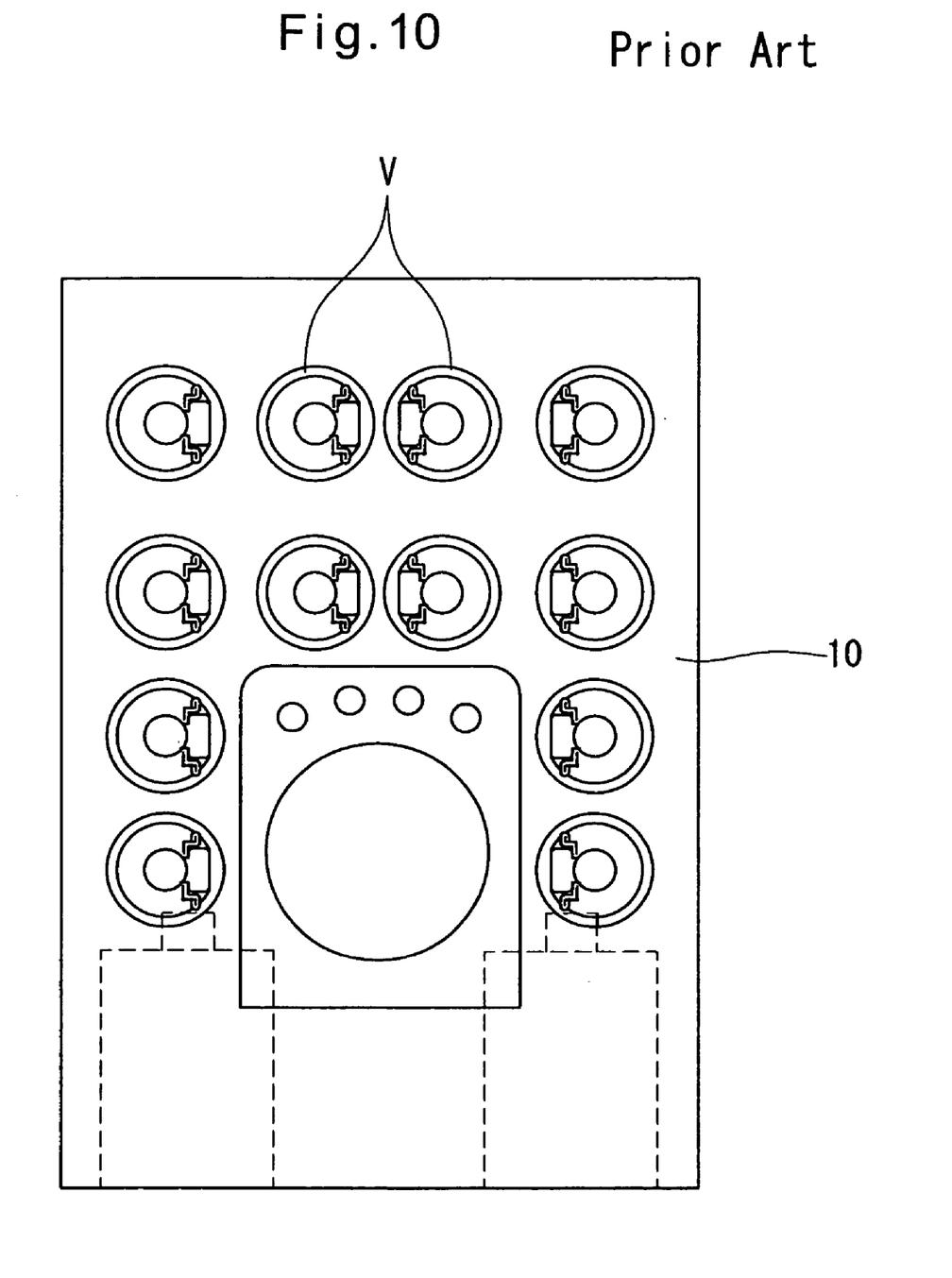
FIG. 10 shows how conventional solenoid valves are arranged in an actuator for controlling brake hydraulic pressure.

In order to reduce the height H of the actuator A, in the arrangement of FIG. 10, the solenoid valves V are arranged at shorter intervals in the direction of the height H of the actuator. But even with this arrangement, it is often difficult to sufficiently reduce the height H of the actuator.

SUMMARY OF THE INVENTION

An object of the present invention is to reduce the size, especially the height, of an actuator for controlling brake hydraulic pressure.

According to the present invention, this object is achieved by reducing a width of each solenoid valve of an actuator for controlling brake hydraulic pressure and mounting a plurality of such solenoid valve in the actuator such that the width direction of each solenoid valve coincides with a direction (e.g. the height direction) of the actuator in which it is required to reduce the size of the actuator.

The solenoid valve according to the present invention includes a yoke having a substantially U-shaped section, based on the finding that a yoke having a U-shaped section can achieve its expected function, i.e. the function of forming a magnetic path. Since such a U-shaped yoke has a width smaller than the outer diameter of conventional tubular yokes, the solenoid valve according to the present invention has a smaller width $W_1$ (FIG. 4) than conventional solenoid valves including tubular yokes. By arranging a plurality of such solenoid valves in the housing of an actuator for controlling brake hydraulic pressure such that the width directions of the respective solenoid valves coincide with the direction of the actuator in which it is required to reduce the size of the actuator, it is possible to reduce the size of the actuator in this direction.

In this arrangement, each flange preferably has a first end extending substantially along the circular outer peripheral edge of the coil winding, thereby minimizing the length of the flanges of the yoke and thus the dimension of the entire solenoid valve in the width direction of the flanges.

Specifically, according to the present invention, there is provided a solenoid valve for an actuator for controlling brake hydraulic pressure, the solenoid valve comprising a yoke comprising a pair of parallel flanges each having first and second ends and a web connected to the second ends of the flanges, the yoke having a substantially U-shaped section, a bobbin received in the yoke, a current-excited coil wound around the bobbin, forming a coil winding, a movable core provided inside the bobbin so as to be movable in an axial direction of the bobbin, and including a valve rod, a valve body disposed at a free end of the valve rod, and a valve seat having a seating surface, the valve body being configured to be moved into and out of contact with the seating surface of the valve seat when the movable core moves in the axial direction of the bobbin, the flanges having a width that is greater than a diameter of the coil winding and smaller than the sum of the diameter of the coil winding and twice the thickness, preferably the thickness, of the yoke, the flanges each having the first end thereof extending substantially along an outer peripheral edge of the coil winding, a plurality of the solenoid valves being configured to be mounted, independently of each other, in a housing of the actuator in a plurality of rows and a plurality of columns.

A plurality of such solenoid valves are mounted in a housing of an actuator for controlling brake hydraulic pressure so as to be arranged in a plurality of rows and a plurality of columns in the same manner as conventional actuators. By arranging the solenoid valves such that the length directions of the flanges of the yokes thereof coincide with each other, it is possible to minimize the dimension of the actuator in the length directions of the flanges.

For example, if eight of such solenoid valves are mounted in the housing of the actuator for controlling brake hydraulic pressure, they may be arranged in two rows, each row comprising four of the eight solenoid valves, with two of the four solenoid valves in each row that are at both ends of the row each positioned such that the first ends of the flanges of the yoke thereof face toward or away from the other three solenoid valves in the row.

By arranging the solenoid valves such that the length directions of the flanges of their yokes coincide with each other, the solenoid valves can be easily mounted in the housing.

The solenoid valves may be arranged such that the length directions of the flanges of their yokes coincide with the width direction of the actuator.

If more than eight such solenoid valves (hydraulic pressure control valves) are mounted in the actuator, at least eight of them are arranged as described above.

The solenoid valve according to the present invention has a smaller width, and thus takes up less mounting space, than conventional solenoid valves. By mounting a plurality of such solenoid valves in an actuator for controlling brake hydraulic pressure, it is possible to reduce the size of the actuator too.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
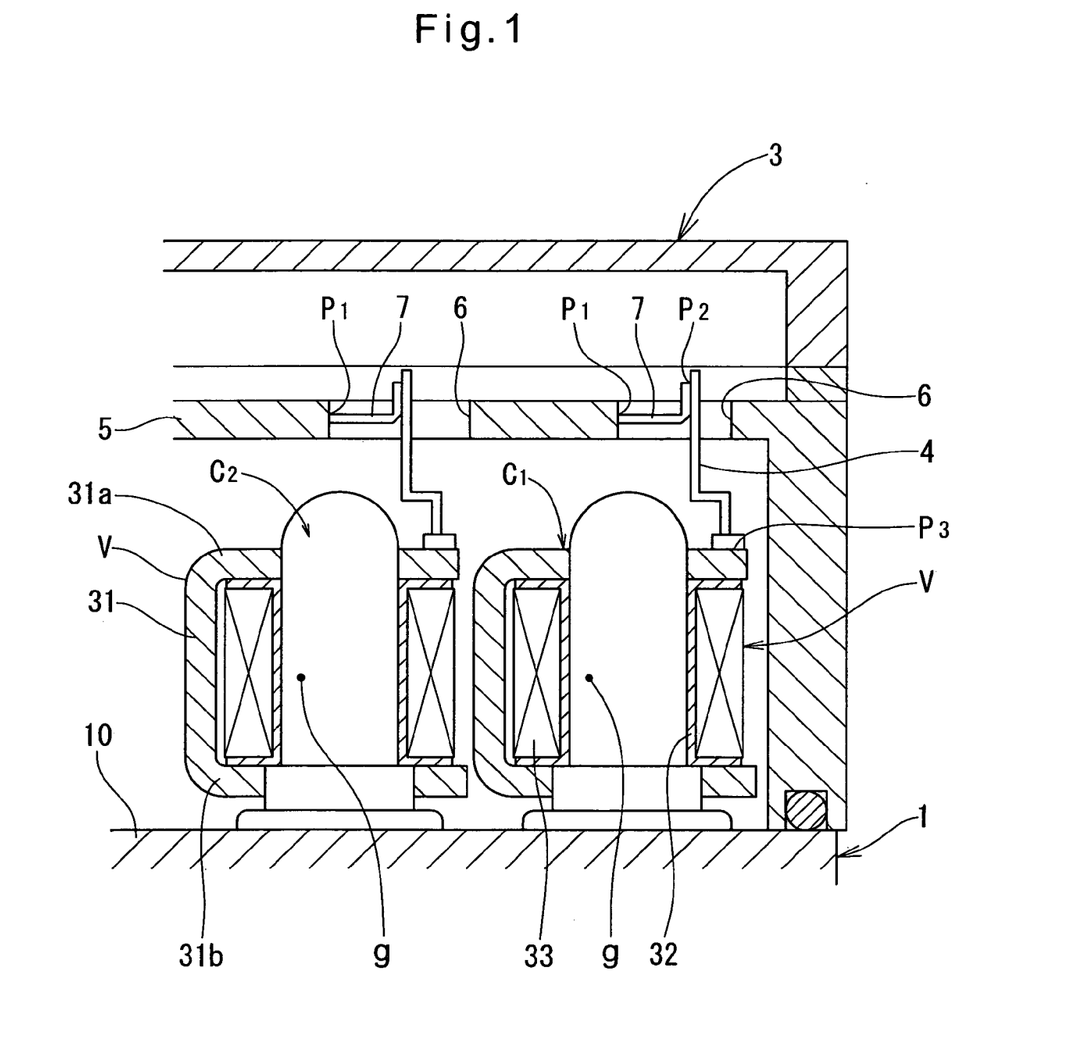
FIG. 1 is a partially cutaway front view of a portion of an actuator for controlling brake hydraulic pressure embodying the present invention.
Figure 2:
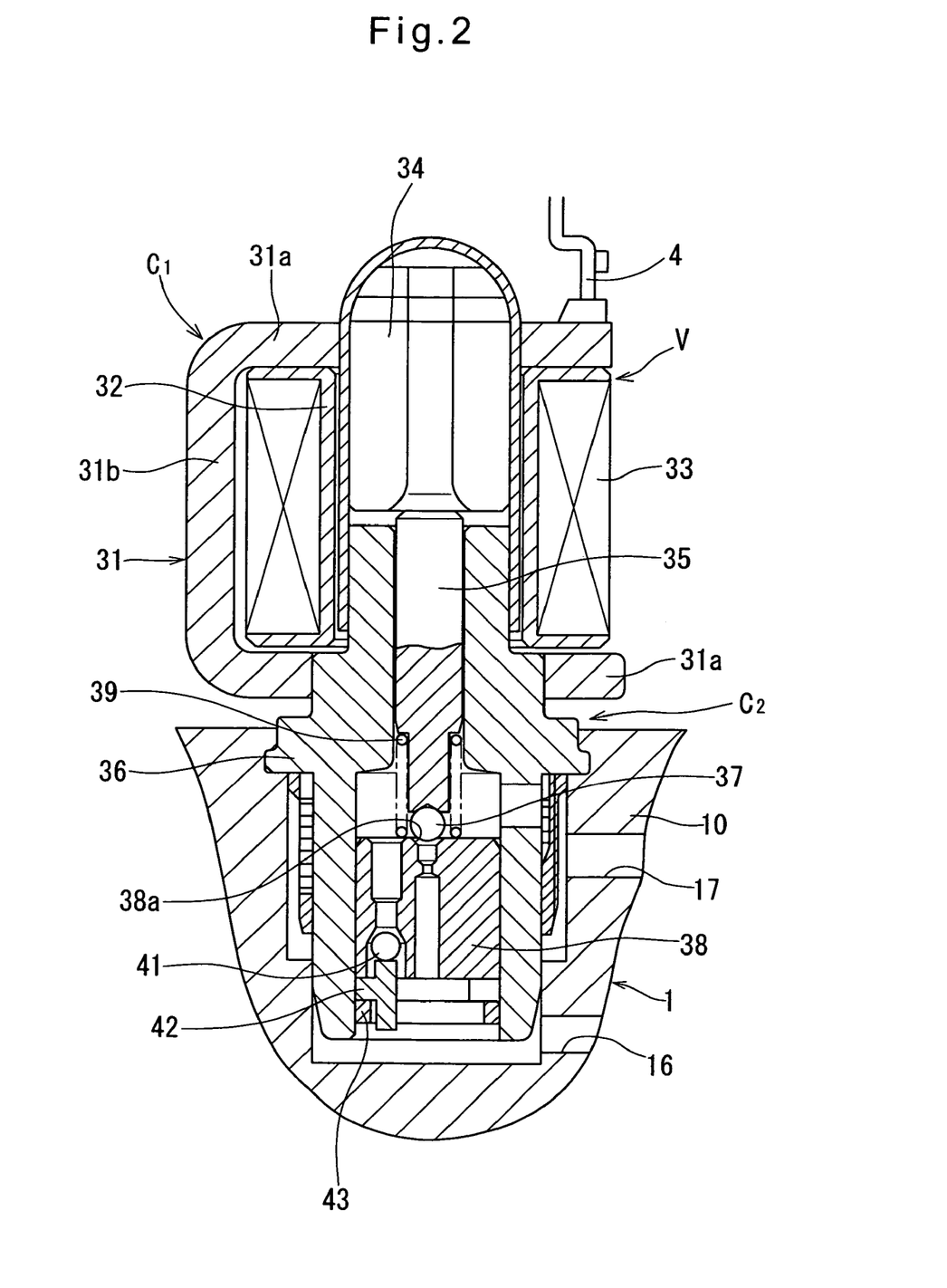
FIG. 2 is a partially cutaway front view of a solenoid valve in the actuator of FIG. 1.

FIGS. 1 to 4 show a solenoid valve 30 embodying the present invention, which is a pressure increasing control valve including, like conventional valves, a yoke 31, a bobbin 32 received in the yoke 31, a current-excited coil 33 wound around the bobbin 32, a movable core 34 having a valve rod 35 and axially movably received in the bobbin 32, and a valve body 37 disposed at the free end of the valve rod 35 and moved into and out of contact with a seating surface 38a of a valve seat 38 by the movable core 34 (see FIG. 2).

In these figures and the figures showing the prior art, like elements are denoted by like numerals. The solenoid valve of FIG. 2 further includes a check valve 41, a filter 42, and a ring 43 pressed into a valve housing 36 to fix the filter 42 in position.

In this embodiment, the yoke 31 and the coil 33 are separable from the valve housing 36 by sliding the former along the latter. More specifically, a coil assembly $C_1$ (see FIG. 2) comprising the yoke 31, bobbin 32 and coil 33 is separable from a main body $C_2$ including the valve housing 36, which is fixed to a housing 10 of the hydraulic unit, and the movable core 34 including the valve rod 35 by upwardly (in FIG. 2) sliding the former relative to the latter (in the manner as shown in FIG. 9).

Unlike conventional yokes, the yoke 31 of this embodiment comprises upper and lower flanges 31a having first and second ends and a web 31b through which the second ends of the flanges 31a are joined together and thus has a substantially U-shaped cross-section, with the flanges 31a having a width $W_1$ (see FIG. 4) that is greater than the outer diameter s of the winding of the coil 33 and smaller than the sum of the outer diameter s of the winding of the coil 33 and the thickness t (see FIG. 3) of the yoke 31 ($s < W_1 < s+t$).

Figure 4:
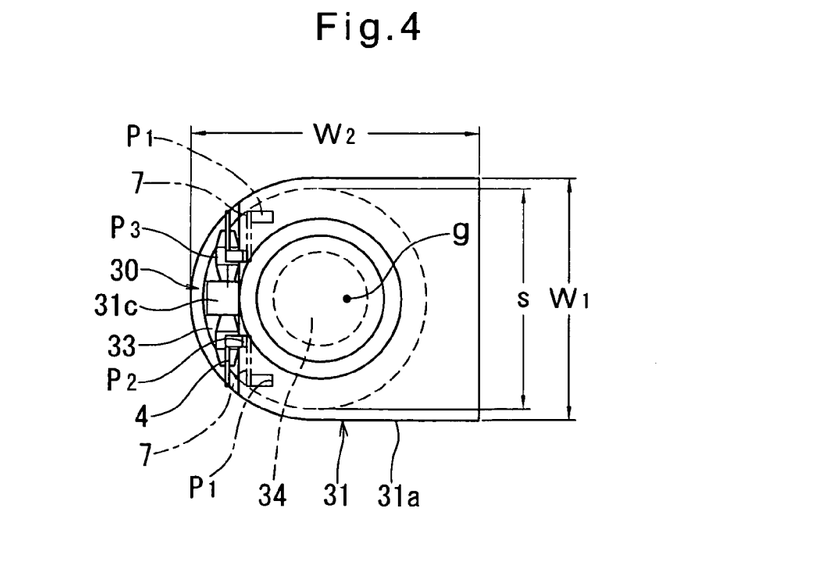
FIG. 4 is a plan view of the solenoid valve of FIG. 2.

With this arrangement, the width of the solenoid valve 30 is equal to the width $W_1$ of the flanges 31a.

Figure 3:
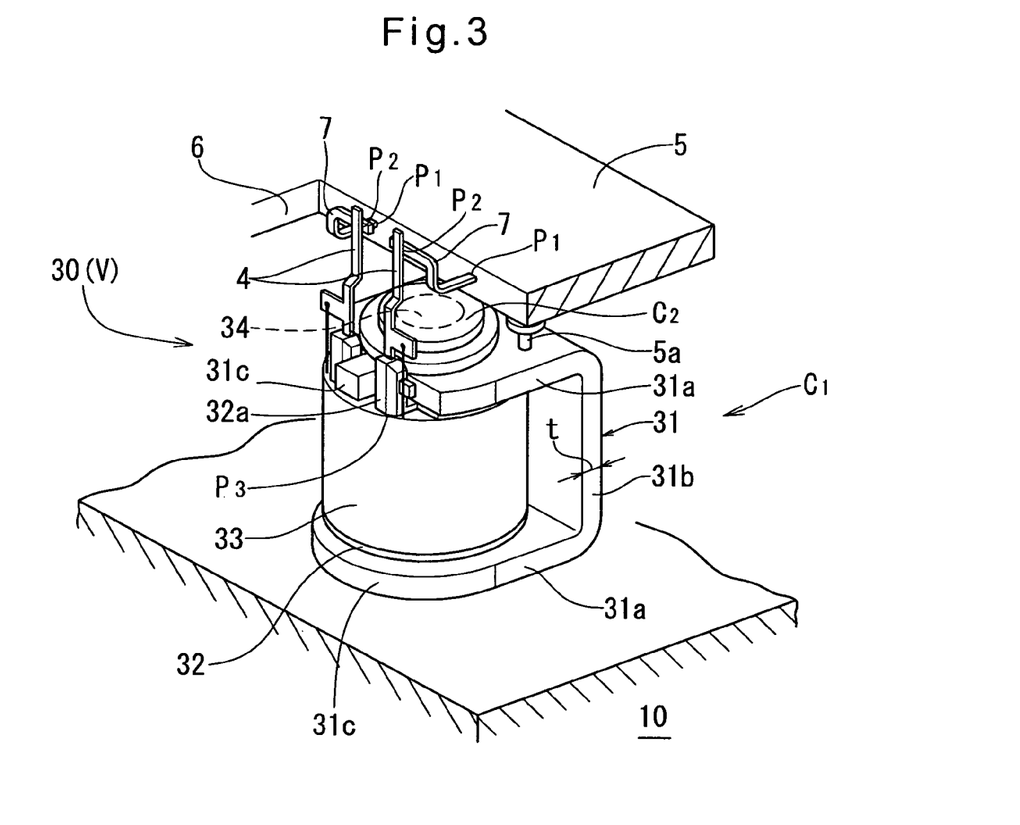
FIG. 3 is a perspective view of the solenoid valve of FIG. 2.

In this embodiment, as shown in FIG. 3, the lower flange 31a has its first end 31c arcuately curved substantially along the circular outer peripheral edge of the winding of the coil 33. The upper flange 31a has its first end 31c disposed slightly radially inwardly from the circular outer peripheral edge of the winding of the coil 33 to such an extent that a magnetic path is formed by the yoke and the upper flange can stably guide the movement of the core 34. But instead, the lower flange 31a may have its first end 31c disposed slightly radially inwardly as with the upper flange 31a to such an extent that a magnetic path is formed by the yoke and the lower flange can stably guide the movement of the core 34. Also, the upper flange 31a may have its first end 31c arcuately curved substantially along the circular outer edge of the winding of the coil as with the lower flange 31a.

With this arrangement, it is possible to minimize the length $W_2$ (i.e. the dimension perpendicular to the width $W_1$; see FIG. 4) of the flanges 31a and thus the length of the solenoid valve 30.

Lead terminals 4 connected to the coil 33 extend through terminal support pieces 32a (see FIG. 3) of the bobbin 32 provided near the first end of the upper flange 31a, and protrude from the respective terminal support pieces 32a. Each lead terminal 4 comprises a first portion protruding upwardly (in FIG. 1) from the terminal support piece 32a, a second bent portion extending from the free end of the first portion toward the web 31b, and a third portion extending upwardly from the free end of the second bent portion.

A pressure reducing control valve 20 according to the present invention is also of substantially the same structure as the above-described pressure increasing control valve 30.

The actuator according to the present invention includes solenoid valves V comprising a plurality of the above-described pressure increasing valves 30 and a plurality of the above-described pressure reducing valves 20 that are arranged in a plurality of rows and a plurality of columns such that the direction of the width $W_1$ of the yoke of each valve V coincides with a direction of the actuator in which it is desired to reduce the dimension of the actuator, typically the direction of the height H of the actuator in FIG. 6.

Figure 5A:
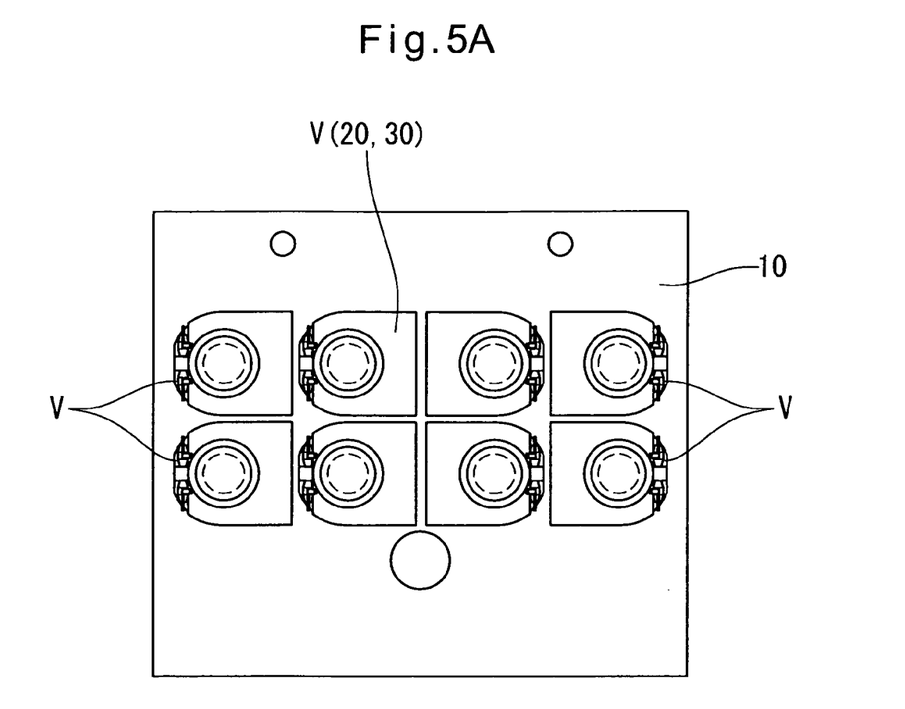
FIGS. 5A to 5H show different arrangements of a plurality of solenoid valves according to the present invention in an actuator for controlling brake hydraulic pressure.
Figure 5B:
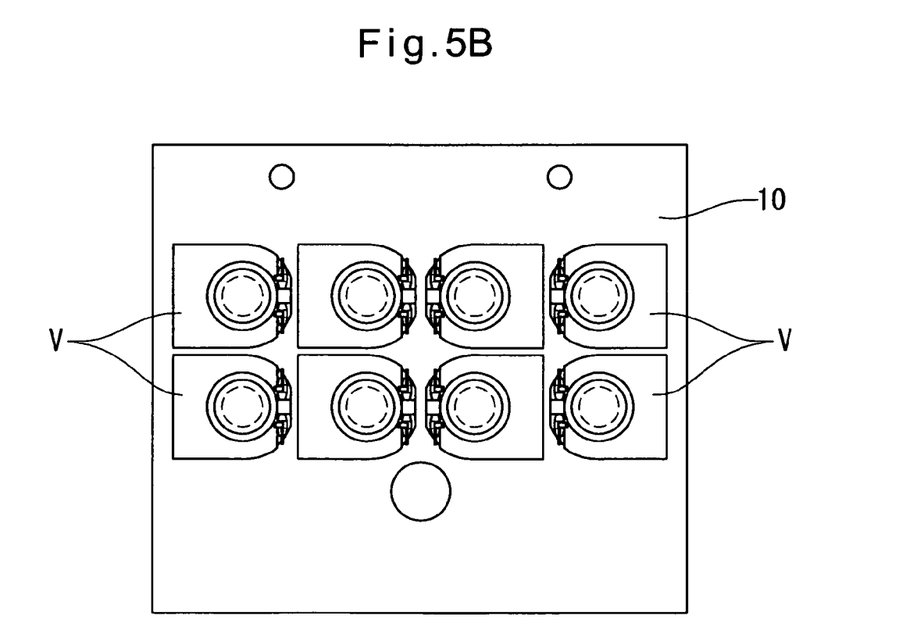

For example, if the actuator includes eight such solenoid valves (control valves) V, they may be arranged as shown in FIGS. 5A and 5B. If the actuator includes ten such solenoid valves V, they may be arranged as shown in FIGS. 5C to 5H.

With this arrangement, the orientation of the first ends of the flanges 31a of each yoke (orientation in the length direction of the flanges 31a) is determined according to the structure of the housing 10. For example, in the arrangements of FIGS. 5A, 5C, 5D and 5G, the two solenoid valves V on each side of each of two rows each consisting of four solenoid valves V are oriented such that the first ends of their flanges face away from the two valves on the other side of the row. In the arrangements of FIGS. 5B, 5E, 5F and 5H, the two valves on each side of each of two rows each consisting of four solenoid valves V are oriented such that the first ends of their flanges face toward the two valves on the other side of the row.

Figure 5C:
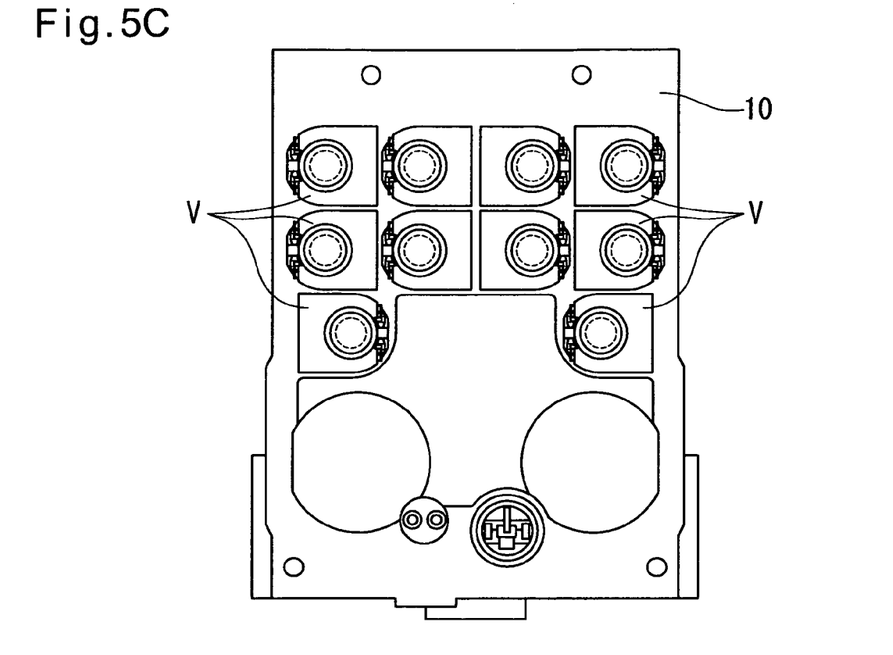
Figure 5D:
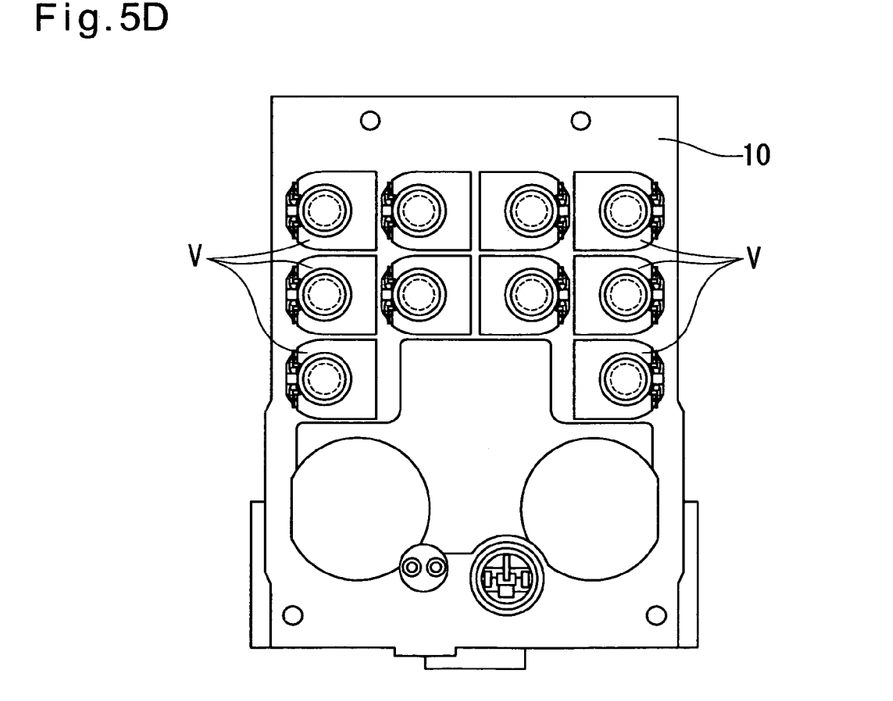
Figure 5E:
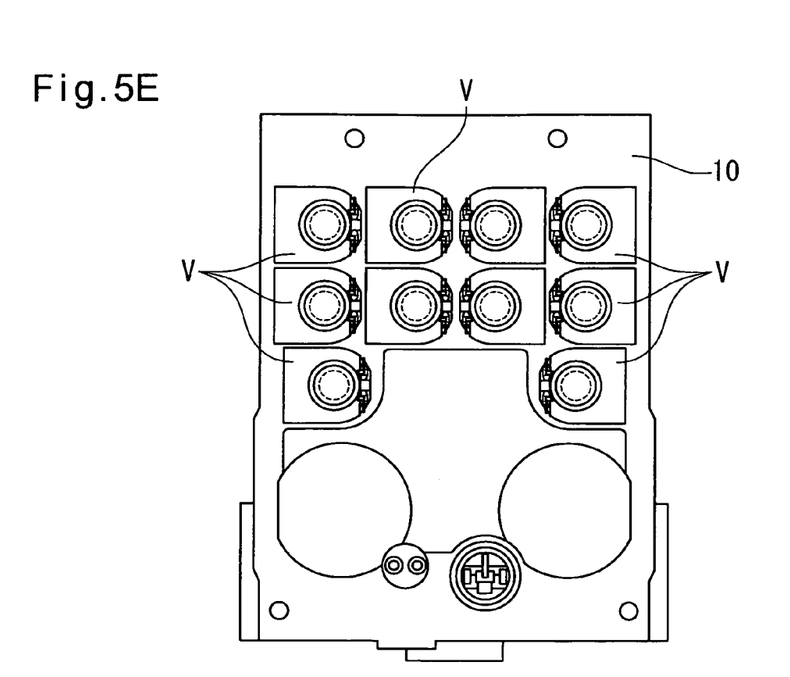
Figure 5F:
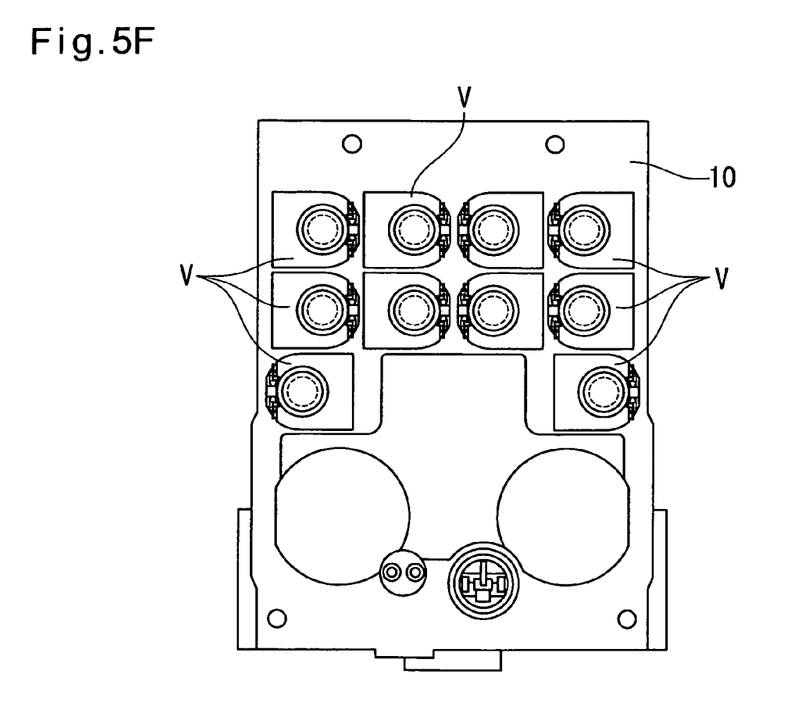
Figure 5G:
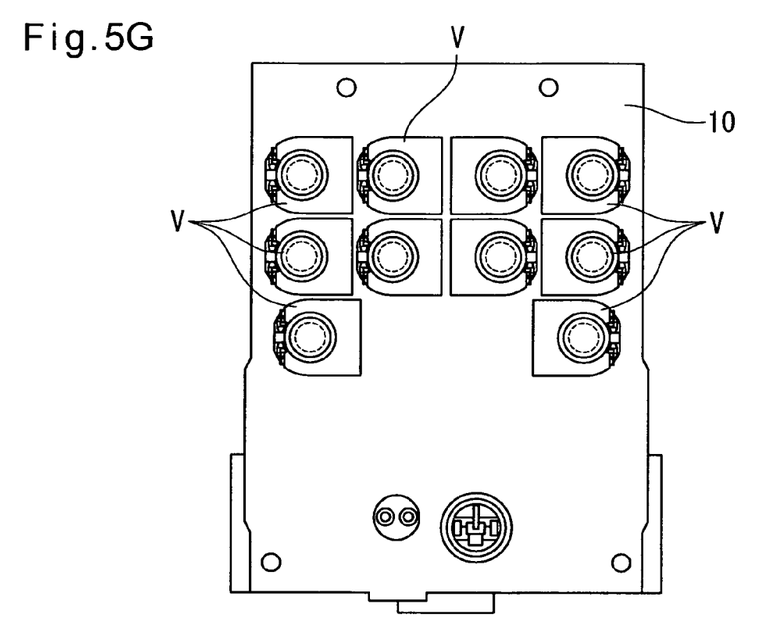
Figure 5H:
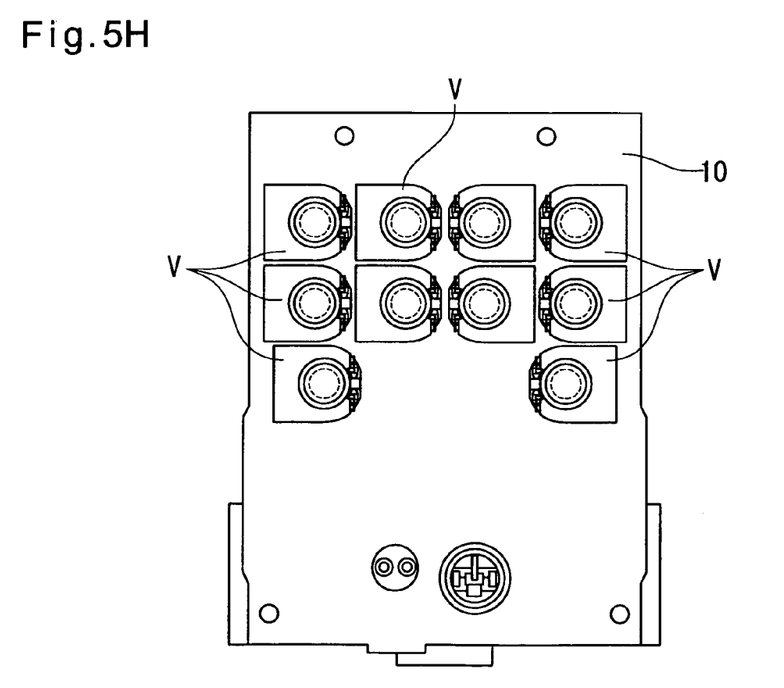

Also, the position and orientation of each solenoid valve V are preferably determined taking into consideration the shape of the mounting surface (surface of the sheet of each drawing) of the housing 10. For example, if it is necessary to mount a solenoid valve V near an arcuately curved portion of the mounting surface, the solenoid valve V is preferably positioned and oriented such that its arcuately curved portion is disposed in juxtaposition with the arcuately curved portion of the mounting surface (as shown in FIGS. 5C and 5E). If it is necessary to mount a solenoid valve V near an angular portion of the mounting surface, the solenoid valve V is preferably positioned and oriented such that its angular portion is disposed in juxtaposition with the angular portion of the mounting surface (as shown in FIGS. 5D and 5F).

In the embodiments shown in FIGS. 5A to 5H, the solenoid valves V are arranged such that the width direction of the flanges 31a of each solenoid valve V coincides with the direction of the height (H in FIG. 6) of the housing 10 (actuator A). Thus, if the diameter of the winding of the coil 33 of each solenoid valve V is the same, the actuator according to the present invention has a smaller height H than conventional actuators of this type.

As shown in FIGS. 1 and 3, the solenoid valves V are provided so as to face a housing 5 of an electronic control unit (ECU) 3. The ECU housing 5 is formed with holes 6 at positions corresponding to the lead terminals 4 of the respective solenoid valves V. Busbars 7 connected to a control circuit for the solenoid valves V protrude from the inner wall of each hole 6.

Each busbar 7 protrudes from the inner wall of the hole 6 at point $P_1$ disposed, as viewed from the axial direction of the solenoid valve (see FIG. 4), between the center of gravity g of the coil assembly $C_1$ and the points $P_3$ at which the pair of lead terminals 4 are connected to the coil 33 (leftwardly of the center of gravity g in FIG. 4).

The ECU housing 5 is formed by resin molding with the busbars 7 inserted therein. Each of the pair of busbars 7 comprises a first portion extending from point $P_1$ in a direction perpendicular to the axis of the winding of the coil 33, a second bent portion extending axially of the winding of the coil 33 from the free end of the first portion, and a third bent portion extending in a direction perpendicular to the axis of the winding of the coil 33 from the free end of the second bent portion toward the other busbar 7. The third bent portion of each busbar 7 is fixed to and connected to the third portion of the corresponding lead terminal 4 at point $P_2$ as shown in FIG. 3.

With this arrangement, as viewed from the axial direction of the solenoid valve V (see FIG. 4), points $P_2$ are located between points $P_1$ and points $P_3$.

The solenoid valves V are mounted in the housing 10 of the hydraulic unit as shown in FIG. 1 with the valves V shown disposed one over the other. Thus, each coil assembly $C_1$ is supported in cantilever fashion by the busbars 7 and the lead terminals 4, which are fixed to the busbars 7 at points $P_2$.

Generally speaking, when each coil assembly $C_1$ is supported by the pair of lead terminals 4 of the coil 33 and the pair of busbars 7 of the ECU which are connected to the lead terminals 4 at points $P_2$, if the points $P_2$ are located on the straight line parallel to the axis of the coil winding and passing the center of gravity g of the coil assembly $C_1$, moment will scarcely act or not act at all on the connecting points $P_2$ even if the coil assembly $C_1$ moves (vibrates) relative to the valve housing 36.

Also, the greater the distance between the points $P_3$ and the points $P_1$, the larger the deflection of the coil assembly $C_1$, which in turn increases stress acting on the connecting points $P_2$ between the lead terminals 4 and the busbars 7. Because the stress on the connecting points $P_2$ is produced by the moment based on the weight of the coil assembly $C_1$ and proportional to the distance between points $P_1$ and points $P_3$, this distance is preferably as small as possible in order to reduce the moment that acts on the contact points $P_2$.

Thus, in order to reduce the stress on the connecting points $P_2$ between the lead terminals 4 and the busbars 7, which results from deflection of the coil assembly $C_1$, the points $P_1$, at which the busbars 7 protrude from the ECU housing 15, are preferably located, as viewed from the axial direction of the winding of the coil 33, between the center of gravity g of the coil assembly $C_1$ and the points $P_3$, at which the lead terminals 4 extend from the coil 33.

In this embodiment, because busbars 7 and the lead terminals 4 are connected together and each coil assembly $C_1$ is supported so as to satisfy all of the above-described requirements, it is possible to minimize stress on the connecting points $P_2$ due to deflection of the coil assemblies $C_1$.

When the ECU housing 5 is mounted on the hydraulic unit housing 10, protrusions 5a (see FIG. 3) formed on the bottom surface of the ECU housing 5 abuts the yokes 31 of the respective solenoid valves 30(V). The solenoid valves 30(V) (coil assemblies $C_1$) are thus securely sandwiched between the hydraulic unit housing 10 and the ECU housing 5, and additionally held in position by the protrusions 5a. This minimizes deflection of the valves 30(V) (coil assemblies $C_1$).

If it is necessary to reduce the width WA (see FIG. 6) of the actuator A, each solenoid valve V is arranged such that the direction of the width $W_1$ of its flanges 31a coincides with the direction of the width WA of the actuator A.

Various modifications and alterations can be made to the embodiments without departing from the spirit of the present invention. For example, connecting points $P_2$ between the lead terminals 4 and the respective busbars 7 may not be disposed between the points $P_1$ and points $P_3$. The abovementioned second bent portion and/or third portion of each lead terminal 4 may be omitted. Also, the abovementioned second bent portion of each busbar 7 may be omitted.

A motor unit 2 and the ECU 3 may be mounted to the opposed sides of the hydraulic unit housing 10 as shown in FIGS. 6 and 7. But instead, the motor unit 2 and the ECU 3 may be mounted to the same one side of the hydraulic unit housing 10. Also, the motor unit 2 may be mounted not to the hydraulic unit housing 10 but to a different member.

What is claimed is:

1. A solenoid valve for an actuator for controlling brake hydraulic pressure, said solenoid valve comprising:
    a yoke comprising a pair of parallel flanges each having first and second ends and a web connected to said second ends of said flanges, said yoke having a substantially U-shaped section;
    a bobbin received in said yoke;
    a current-excited coil wound around said bobbin, forming a coil winding;
    a movable core provided inside said bobbin so as to be movable in an axial direction of said bobbin, and including a valve rod;
    a valve body disposed at a free end of said valve rod; and
    a valve seat having a seating surface;
    said valve body being configured to be moved into and out of contact with said seating surface of said valve seat when said movable core moves in the axial direction of said bobbin;
    said flanges having a width that is greater than a diameter of said coil winding and smaller than the sum of the diameter of said coil winding and a thickness of said yoke;
    said flanges each having said first end thereof extending substantially along an outer peripheral edge of said coil winding;
    a plurality of said solenoid valves being configured to be mounted, independently of each other, in a housing of the actuator in a plurality of rows and a plurality of columns.

2. An actuator for controlling hydraulic brake pressure, said actuator comprising a housing and a plurality of solenoid valves mounted, independently of each other, in said housing so as to be arranged in a plurality of rows and a plurality of columns:
    said solenoid valves each comprising:
    a yoke comprising a pair of parallel flanges each having first and second ends and a web connected to said second ends of said flanges, said yoke having a substantially U-shaped section;
    a bobbin received in said yoke;
    a current-excited coil wound around said bobbin, forming a coil winding; a
    movable core provided inside said bobbin so as to be movable in an axial direction of said bobbin, and including a valve rod;
    a valve body disposed at a free end of said valve rod; and
    a valve seat having a seating surface;
    said valve body being configured to be moved into and out of contact with said seating surface of said valve seat when said movable core moves in the axial direction of said bobbin;
    said flanges having a length and a width that is perpendicular to said length, said width being greater than a diameter of said coil winding and smaller than the sum of the diameter of said coil winding and a thickness of said yoke;
    said flanges each having said first end thereof extending substantially along an outer peripheral edge of said coil winding;
    wherein said solenoid valves are arranged such that the length directions of said flanges of said yokes thereof coincide with each other.

3. The actuator of claim 2 wherein said actuator has a height and a width perpendicular to said height, and is mounted on a vehicle with a height coincident with the height of the vehicle, and wherein said length directions of the flanges coincide with said width of the actuator.

4. The actuator of claim 2 wherein there are eight of said solenoid valves which are arranged in two rows, each row comprising four of said eight solenoid valves, two of said four solenoid valves in each row that are at both ends of said each row being each positioned such that said first ends of said flanges of said yoke thereof face away from the other three solenoid valves in said each row.

5. The actuator of claim 2 wherein there are eight of said solenoid valves which are arranged in two rows, each row comprising four of said eight solenoid valves, two of said four solenoid valves in each row that are at both ends of said each row being each positioned such that said first ends of said flanges of said yoke thereof face toward the other three solenoid valves in said each row.

* * * * *